US009876645B1

(12) United States Patent
Ramalingam et al.

(10) Patent No.: US 9,876,645 B1
(45) Date of Patent: Jan. 23, 2018

(54) TAMPER DETECTION FOR HARDWARE DEVICES

(71) Applicant: Amazon Technologies, Inc., Seattle, WA (US)

(72) Inventors: Harsha Ramalingam, Kirkland, WA (US); Jesper Mikael Johansson, Redmond, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 14/624,480

(22) Filed: Feb. 17, 2015

(51) Int. Cl.
H04L 9/32 (2006.01)
G06F 21/57 (2013.01)

(52) U.S. Cl.
CPC ............ *H04L 9/3247* (2013.01); *G06F 21/57* (2013.01); *G06F 2221/034* (2013.01)

(58) Field of Classification Search
CPC ... H04L 9/3247; G06F 21/57; G06F 2221/034
USPC ......................................... 713/176
See application file for complete search history.

(56) References Cited

U.S. PATENT DOCUMENTS

2003/0204743 A1* 10/2003 Devadas .................. G06F 21/31 726/9
2014/0380416 A1* 12/2014 Adachi ................... H04L 63/20 726/2

OTHER PUBLICATIONS

Maunder, C.M., and R.E. Tulloss, "The Test Access Port and Boundary Scan Architecture," IEEE Computer Society Press, Los Alamitos, California, 1990, Chapter 4, "IEEE Std. 1149.1: The Top-Level View," pp. 33-49.
"Information Technology—Trusted Platform Module—Part 1: Overview," International Organization for Standardization/International Electrotechnical Commission ISO/IEC 11889-1:2009(E), May 15, 2009, 20 pages.
"Information Technology—Trusted Platform Module—Part 2: Design Principles," International Organization for Standardization/International Electrotechnical Commission ISO/IEC 11889-2:2009(E), May 15, 2009, 152 pages.
"Information Technology—Trusted Platform Module—Part 3: Structures," International Organization for Standardization/International Electrotechnical Commission ISO/IEC 11889-3:2009(E), May 15, 2009, 204 pages.

(Continued)

*Primary Examiner* — Kambiz Zand
*Assistant Examiner* — Benjamin Kaplan
(74) *Attorney, Agent, or Firm* — Davis Wright Tremaine LLP

(57) ABSTRACT

A manufacturer of computing equipment may generate a signature for computing equipment by measuring various attributes of the computing equipment, such as the impedance across circuits included in the computing equipment. Verification equipment may be provided to a recipient of the computing equipment. The verification equipment may be configured to generate a signature of the computing equipment over a physical connection between the verification equipment and the computing equipment. A determination may be made whether the computing equipment has been tamper with based at least in part on the signature generated by the manufacturer and the signature generated by the recipient.

20 Claims, 9 Drawing Sheets

(56) References Cited

OTHER PUBLICATIONS

"InformationTechnology—Trusted Platform Module—Part 4: Commands," International Organization for Standardization/International Electrotechnical Commission ISO/IEC 11889-4:2009(E), May 15, 2009, 254 pages.
"TPM Main: Part 1 Design Principles—Specification Version 1.2—Level 2 Revision 103," Trusted Computing Group, Inc., Jul. 9, 2007, 182 pages.
"TPM Main: Part 2 TPM Structures—Specification Version 1.2—Level 2 Revision 103," Trusted Computing Group, Inc., Jul. 9, 2007, 198 pages.
"TPM Main: Part 3 Commands—Specification Version 1.2—Level 2 Revision 103," Trusted Computing Group, Inc., Jul. 9, 2007, 330 pages.
"TPM Main: Part 1 Design Principles—Specification Version 1.2—Revision 116," Trusted Computing Group, Inc., Mar. 1, 2011, 184 pages.
"TPM Main: Part 2 TPM Structures—Specification Version 1.2—Revision 116," Trusted Computing Group, Inc., Mar. 1, 2011, 201 pages.
"TPM Main: Part 3 Commands—Specification Version 1.2—Revision 116," Trusted Computing Group, Inc., Mar. 1, 2011, 339 pages.

* cited by examiner

US 9,876,645 B1

TAMPER DETECTION FOR HARDWARE DEVICES

BACKGROUND

The manufacture and use of computing equipment, for a variety of purposes, has proliferated in recent years. Manufacturers, distributors, and retailers may offer for sale computing equipment which may be purchased by organizations and other entities. The computing equipment may then be delivered to the recipient, e.g., the organization or other entity acquiring the computing equipment. However, delivery of the computing equipment may provide opportunities for unauthorized access to the computing equipment as the equipment travels from one entity to the other, often being in the physical control of multiple different entities along the way. Ensuring that the equipment has not been altered (e.g., with unauthorized software and/or hardware components) can cause significant effort and/or expense. A recipient of such equipment may, for example, obtain the equipment from the source and guard the equipment during its travels to protect against unauthorized access. This, however, is generally impractical for most entities, especially given the economics involving the abundance of conventional shipping services.

BRIEF DESCRIPTION OF THE DRAWINGS

Various embodiments in accordance with the present disclosure will be described with reference to the drawings, in which.

DETAILED DESCRIPTION

Figure 1:
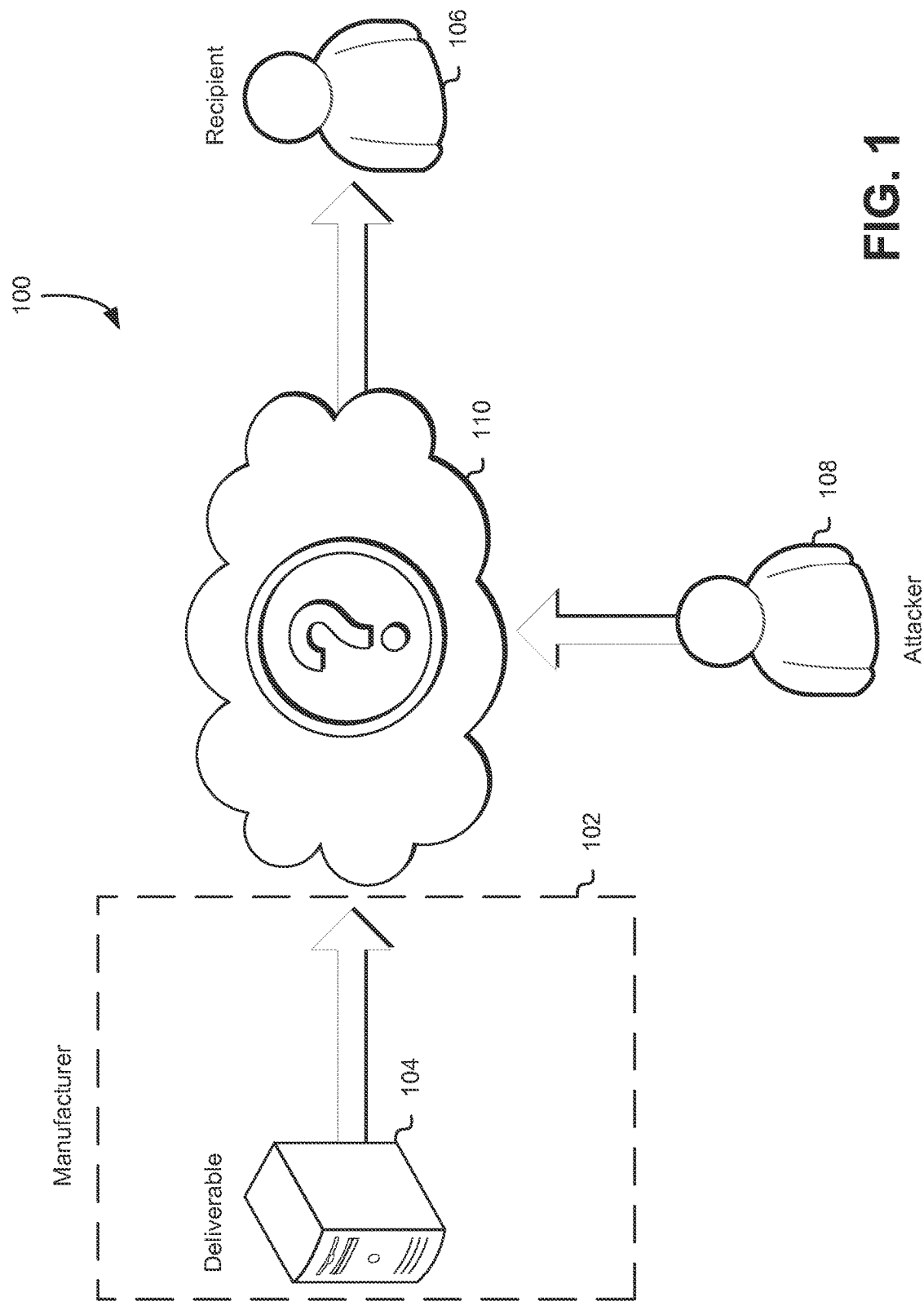
FIG. 1 illustrates an environment in which computing equipment may be exposed to attack before delivery to a recipient in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements in detecting hardware tampering by a recipient of computing equipment. A manufacturer or similar entity may sign or determine a signature for hardware (and the software loaded onto the hardware) before delivery to the recipient. The recipient may receive the signature from the manufacturer and then verify the received signature upon receipt. The recipient may verify the signature by at least using verification equipment provided by the manufacturer to generate a signature for the received hardware and comparing the generated signature to the received signature from the manufacturer. Specifically, the hardware can be signed using small unique variability in the physical parameters between any two units of hardware. For example, impedance at various ports or interfaces of a unit of hardware can be measured across a specified set of frequencies. The measured impedance for a particular unit of hardware may be distinct from the measured impedance for another unit of hardware. The measured impedance may be used, by the manufacturer, to generate and/or determine a signature for a particular unit of hardware. Changes to a unit of hardware, such as an attacker tampering with the unit of hardware, may cause the measured impedance at various ports to differ from the impedance measured by the manufacturer.

Additionally, the physical weight, performance of software executed by the unit of hardware, performance of various components of the unit of hardware, or other parameters of the hardware may be used in determining a signature for the unit of hardware. For example, in order to determine a signature for computing equipment suitable for verification of the computing equipment by the recipient, the manufacturer may measure the impedance of various components of the computing equipment by connecting the verification equipment to a port or interface of the computing equipment. The verification equipment may be configured to execute a variety of different tests of the connected computing equipment. For example, a laptop with 2 Universal Serial Bus (USB) ports, a display port, an Ethernet port may be connected to the verification equipment and impedance measurements across 100, 1000, and 10K Hz may be obtained. The impedance measurements may provide a set of numbers, the precision of the set of numbers may be calibrated for reliability across multiple measurements, and the set of numbers may comprise the signature for the laptop. Multiple measurements may be used to determine a single signature for the computing equipment. Furthermore, a fault tolerance level may be determined such that a signature determined by the recipient may be considered the same as the signature determined by the manufacturer, if the signature determined by the recipient is within a certain range of the signature determined by the manufacturer. Returning to the example above, if impedance measured by the recipient across the display port is within a predefined range of the measured impedance by the manufacturer, the component of the signature may be considered the same for verification purposes. Furthermore, the tolerance level of various components of the signature may be different. For example, the tolerance level for the measured impedance of the USB port may differ from the tolerance level for the measured impedance of the display port. In various embodiments, the average distance or differences in the measured values of the signature determined by the recipient and the values of the signature provided by the manufacturer must be within the tolerance level.

Any tampering with the computing equipment (e.g., affixing or otherwise connecting a listening and/or transmission device) may change the signature. The signature may be sent by the manufacturer to the recipient using a variety of different mechanisms. For example, the signature may be transmitted electronically, separate from the shipment of the hardware. Providing the signature to the recipient allows the recipient to utilize verification equipment, calibrated to standards determined by the manufacturer, to verify the received device against the signature provided by the manufacturer. Similarly the software, e.g., executable code stored on a hard disk drive of the unit of hardware, may be signed prior to delivery to the recipient such that the software can be verified by executing a hard disk testing application (e.g., hashing the data stored on the hard disk drive using a predetermined hashing algorithm) to verify the signature for the software.

FIG. 1 illustrates an environment 100 in which a manufacturer 102 may provide a deliverable 104 to a recipient 106. The manufacturer 102 may be an organization or other entity which provides deliverables 104, such as computing equipment, to recipients. For example, the manufacturer 102 may provide an online marketplace for computing equipment manufactured by the manufacturer 102. Described in greater detail below, the manufacturer 102 may provide a variety of mechanisms to enable the recipient 106 to determine if the deliverable 104 has been tampered with in transit 110. The recipient 106 may be an organization or other entity attempting to obtain computing equipment from the manufacturer 102. For example, the recipient 106 may be a computing resource service provider purchasing computer servers from the manufacturer 102. The deliverables may include any physical computing hardware that may be tampered with or altered by an attacker 108. For example, the deliverables 104 may include laptops, desktops, tablets, mobile phones, server computers, networking appliances, or any other computing device which may be exposed to an attacker 108 during transit 110.

Prior to providing the deliverable 104 to the recipient 106, the manufacturer 102 may determine a signature for the deliverable 104. The determined signature may be used by the recipient 106 to detect modifications to the deliverable 104. For example, the attacker 108 may modify the deliverable 104 by adding additional components to the deliverable during transit 110. As described in greater detail below, the signature may be configured such that changes or modification to the deliverable 104 may cause a change to the signature. Returning to the example above, the modification to the deliverable 104 by the attacker 108 may alter the measured impedance at various ports on the deliverable 104. Additionally, the modification to the deliverable 104 by the attacker 108 may cause various operations of the deliverable 104 to take longer. For example, a particular calculation when executed by the deliverable 104 may take 10 milliseconds longer as a result of the modification to the deliverable 104 made by the attacker 104.

The attacker 108 may tamper with the deliverable 104 during transit 110, performing a variety of different modifications to the deliverable 104. For example, the attacker 108 may attach a vampire tap other similar device configured to intercept signals generated and/or transmitted by the deliverable 104. The attacker 108 may, during transit 110, replace one or more components of the deliverable 104, add components to the deliverable 104 (e.g., the vampire tap described above or an inductive coil with a battery), or modify software or firmware of the deliverable 104. The manufacturer 102 may generate a signature for the deliverable 104, prior to transit 110, the signature may be based at least in part on measurements obtained from the deliverable 104 which may change if the attacker 108 tampers with the deliverable 104 as described above. For example, if the attacker 108 replaces a network interface of the deliverable 104 the measurement of various attributes of the replacement network interface may be different then measurements obtained by the manufacturer of the original network interface. The signature may be provided to the recipient 106 and the recipient may utilize verification equipment to determine if the deliverable 104 has been tampered with by the attacker 106 in transit 110.

Figure 2:
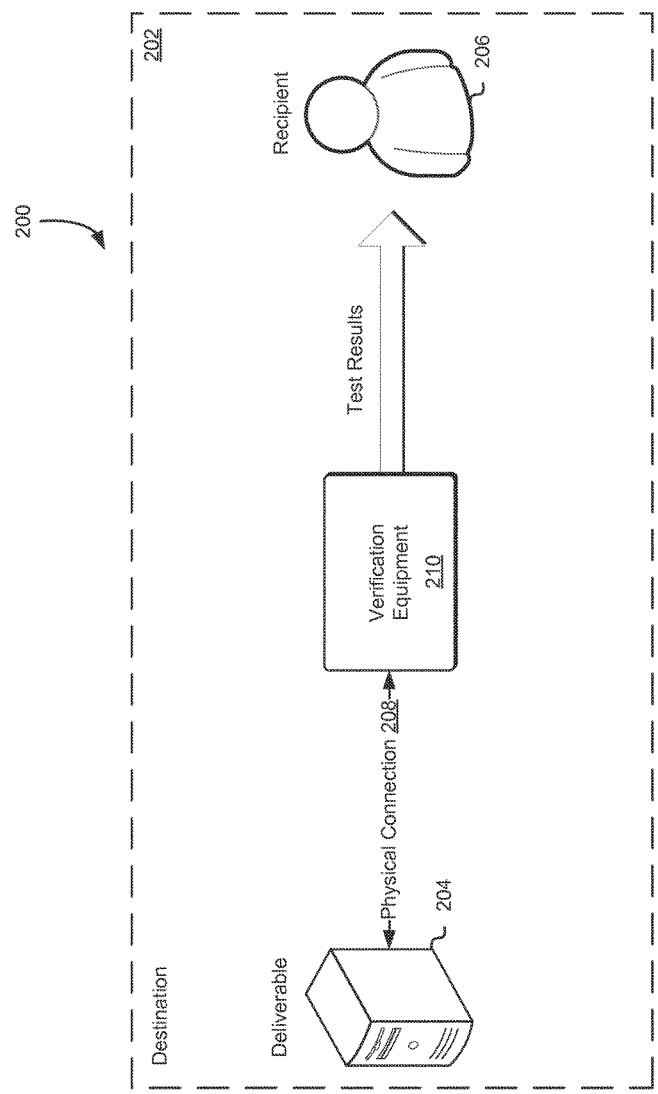
FIG. 2 illustrates an environment in which verification equipment may be used to determine whether computing equipment has been altered before delivery to a recipient in accordance with an embodiment.

FIG. 2 illustrates an environment 200 in which a recipient 206 may verify that a deliverable 204 has not been tampered with based at least in part on a signature obtained from a manufacturer or other entity responsible to providing the deliverable to a destination 202. The destination 202 may be a geographic location suitable for the recipient 106 to accept delivery of the deliverable 204. For example, the destination 202 may be an office building where the recipient 206 conducts business activities. Furthermore, the destination 202 may include verification equipment 210. The verification equipment 210 may be a device configured to generate a signature based at least in part on the deliverable 204. The verification equipment 210 may be provided by the manufacturer, as described above, and may be calibrated based at least in part on verification equipment used by the manufacturer to determine the signature for the deliverable 204 prior to the manufacturer providing the deliverable 204 to the recipient 206 at the destination 202. In various embodiments, the recipient 206 obtains the verification equipment 210 independent from the manufacturer and calibrates the verification equipment 210 based at least in part on calibration information provided by the manufacturer. The signature may include a set of measurements of other information obtained from the deliverable 204. For example, the signature may include a set of ports of the deliverable 204 and a measured impedance of one or more circuits connects to at least one port of the set of ports at different frequencies, a set of application loaded into memory of the deliverable 204 and a hash of each application of the set of application, a result of memory test of the deliverable 204, a latency of an operation of the deliverable 204, or any combination thereof suitable for determining if the deliverable 204 has been tampered with.

The verification equipment 210 may comprise a processor and memory with executable instructions, that, when executed by the processor, cause the verification equipment 210 to determine a signature for the deliverable and provide the recipient 206 with an indication of whether the deliverable 204 has been tampered with. In various embodiments, the verification equipment 210 is configured to display a signature of the deliverable 204 which is then compared by the recipient 206 to the signature provided by the manufacturer in order to determine if the deliverable has been tampered with. In yet another embodiment, the verification equipment is configured to display a score indicating a likelihood or probability that the deliverable 204 has been tampered with. The verification equipment 210 may be physically connected 208 to the deliverable 204 in order to determine a signature for the deliverable 204. For example, the verification equipment 210 may be connected to a USB port of the deliverable 204. The physical connection 208 may be made between the verification equipment 210 and particular inspection pins, described in greater detail below, of the deliverable 204. In various embodiments, the inspections pins are configured such that the recipient may visually inspect the inspections pins and detect if the deliverable 204 has been tampered with. Additionally, the inspection pins may be configured such that once the verification equipment 210 has determined a signature from the deliverable 204 the inspection pins may be removed from the deliverable 204.

The verification equipment 210 may be configured to run a plurality of the tests automatically during the verification of the deliverable 204, the results of the plurality of tests may be used by the verification equipment to determine a signature for the deliverable 204 and/or determine whether the deliverable 204 has been tampered with. For example, once the physical connection 208 between the verification equipment 210 and the deliverable 204 is established, the verification equipment 210 may automatically perform one or more operations to determine a signature for the deliverable 204. In addition, the verification equipment 210 may also be configured load executable instructions into memory of the deliverable 204 and cause execution of the instructions loaded into memory by one or more processors of the deliverable 204. The executable instructions loaded into memory, when executed by the one or more processors, may cause the deliverable to provide the verification equipment 210 with information suitable for determining a signature for the deliverable 204. For example, execution of the instructions may cause the deliverable 204 to perform various tests of the memory and provide the results of the various memory tests to the verification equipment 210 or provide the contents of memory to the verification equipment 210. The memory tests may include memory cycle tests, table dumps of memory, bad sector tests, latency test, or other test of memory.

Similarly, the verification equipment may, through the physical connection 208, test and/or obtain various measurements from a hard disk drive included in the deliverable 204. The verification equipment may be configured to perform a set of operations described herein such as impedance testing, acceptance testing, measuring the current between two points of the deliverable 204, or other operation suitable for determine the signature of the deliverable 204. For example, the impedance of the deliverable 204 may be measured by applying a sinusoidal voltage or waveform to the deliverable 204 in series with a resistor, and measuring the voltage across the resistor and across the deliverable 204. Performing this measurement by sweeping the frequencies of the applied signal provides the impedance phase and magnitude. Information obtained by the verification equipment 210 may comprise the signature for the deliverable and may be compared to the signature determined by the manufacturer in order to determine if the deliverable 204 has been tampered with. In various embodiments, the verification equipment 210 may include a scale or other device to measure the weight of the deliverable 204. The measured weight may be included in the signature determined by the verification equipment 210. The verification equipment may obtain, as an input, the results of the various operations performed by the verification equipment 210 and/or deliverable 204 and may provide the recipient 206 with the test results. The test results may include a signature or a determination of whether the deliverable 204 has been tampered with.

The verification equipment 210 may be further configured to measure electromagnetic radiation or other radiation released by the deliverable 204. The verification equipment 210 may be configured to measure a waveform or a signal over a variety of different frequencies and spectrums. The waveforms measured by the verification equipment 210 may include a shape and form of a signal such as the wave moving in a physical medium or an abstract representation of the wave. A signal the signal, which may be represented by the waveform, may be a function that conveys information about the behavior or attributes of some phenomenon. In another example, any quantity exhibiting variation in time or variation in space (such as an image) may be considered a signal, as described herein, that might provide information on the status of the deliverable 204. The signal may include, among others, audio, video, speech, image, communication, geophysical, sonar, radar, medical, and musical signals. For example, the verification equipment 210 may measure the backlight of a display of the deliverable 204. In another example, the verification equipment 210 may measure the decay rate of a battery connected to a Basic Input/Output System (BIOS) of the deliverable 204.

The test results may be used to generate the signature for the deliverable 204 including a tolerance level within which the generated signature for the deliverable 204 may be considered as matching the signature provided by the manufacturer. A tolerance level may be indicated for each component of the signature. In another example, the tolerance level may indicate a number of components of the signature that must match the signature provided by the manufactured in order for the verification equipment 210 to determine the deliverable 204 has not been tampered with. The verification equipment 210 may be configured to exercise and/or test as many components as possible of the deliverable 204 within a level fidelity sufficient for use to determine a signature for the deliverable 204. For example, the verification equipment 210 may cause the deliverable 204 to calculate a value or determine a result of a computation. The verification equipment 210 may determine an amount of time taken by the deliverable 204 to calculate the value. The amount of time taken by the deliverable 204 to calculate the value may be included in the signature and/or used to determine if the deliverable 204 has been tampered with. For example, if it took the deliverable 204 longer to calculate the value at the destination 202 then the time it took to calculate the value as measured by the manufacturer may indicate that the deliverable has been tampered with.

Additionally, the verification equipment 210 may be configured to repeat verification operations and determine the signature based at least in part on multiple measurements obtained from the repeated verification operations. For example, the verification equipment 210 may measure the impedance at the physical connection 208 over multiple rounds over an interval of time. Each round may provide a measured value that the verification equipment 210 may include in the signature. For example, the verification equipment 210 may take the average of the measured values or other statistically significant values calculated from the set of measured values. Similarly, the testing of the software included in the deliverable 204 and acceptance testing of the deliverable may be repeated over a plurality of rounds. In various embodiments, a signature is determined for each round and a determination is made for each round whether the deliverable 204 has been tampered with.

For example, the verification equipment 210 may be configured to verify the deliverable 204 have not been tampered with over 10 rounds. For each round one or more of the verification operations described above may be executed, such as impedance testing, acceptance testing, software testing, or memory testing. A round signature may then be determined based at least in part on the verification operation performed and determination of tampering may be made based at least in part on the signature provided by the manufacturer. As described above a tolerance level may be applied to the signature generated by the verification equipment 210. If a portion of the rounds indicate that the deliverable 204 has been tampered with as a result of the signature not matching the signature provided by the manufacturer, the verification equipment 210 may indicate that the deliverable 204 have been tampered with.

Figure 3:
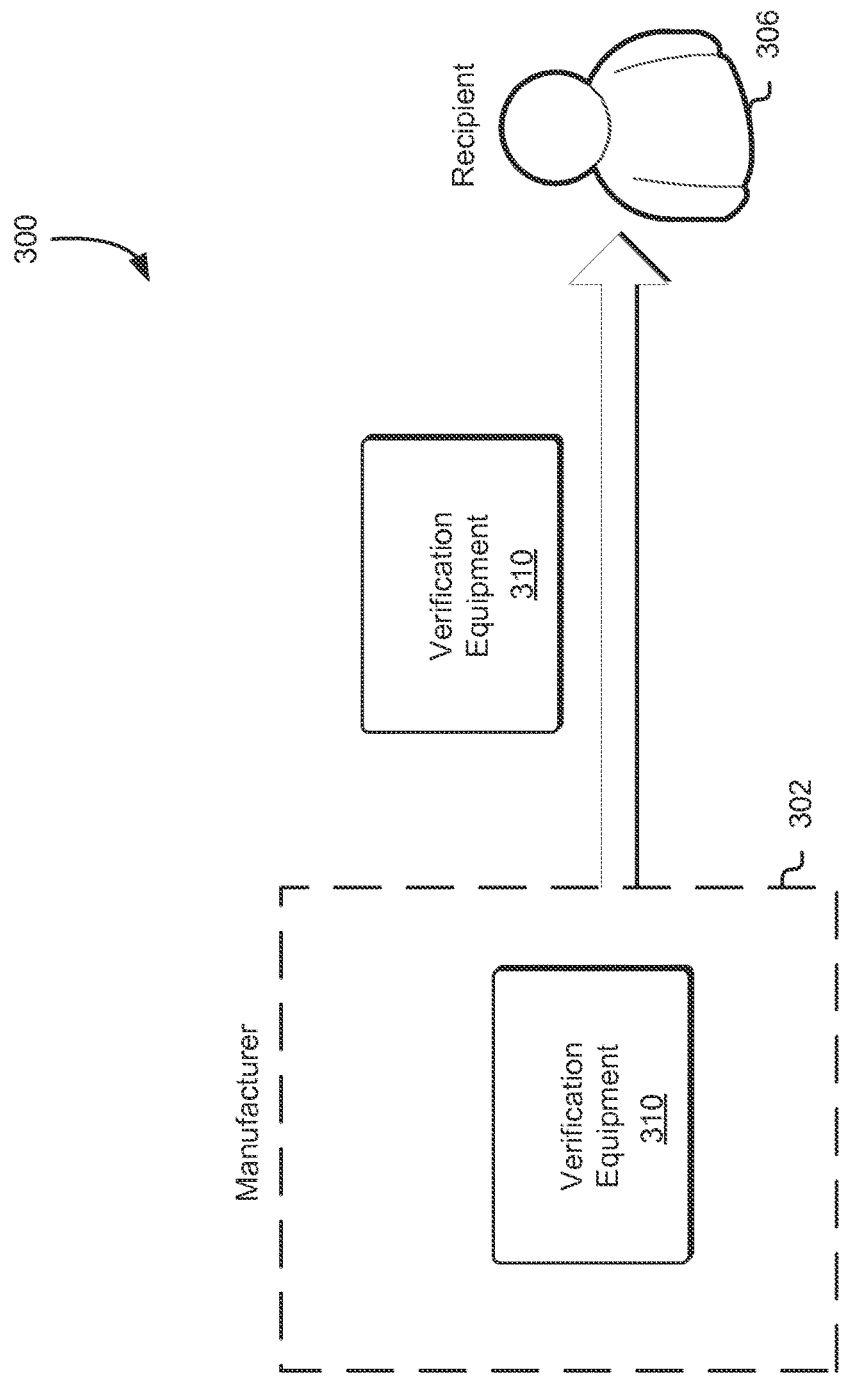
FIG. 3 illustrates an environment in which a manufacturer may provide verification equipment to a recipient in accordance with an embodiment.

FIG. 3 illustrates an environment 300 in which a manufacturer may calibrate and provide verification equipment 310 to a recipient 306. The verification equipment 310 may be used by the recipient 306 to verify that computing equipment, as described above. The verification equipment 310 may be provided to the recipient separate from the deliverable described above. This may reduce the likelihood of an attacker obtaining both the deliverable and the verification equipment 310 and tampering with both. Returning to FIG. 3, manufacturer 302 may calibrate the verification equipment 310 before providing the verification equipment 310 to the recipient 306. Calibrating the verification equipment may include a second verification device or a standard maintained by the manufacturer 302. For example, the manufacturer may maintain a computer system with several ports for which the impedance is known and has been previously measured. The ports may be connected to one or more circuits of the of the computer system for which the impedances at various frequencies is known. The verification equipment 310 may then be used to generate a signature for the computer system. The verification equipment 310 may then be calibrated based at least in part on the generated signature and the known values for the measured impedance of computer system at the several ports.

The verification equipment 310 may be configured by the manufacturer 302 such that the verification equipment 310 maintained the same calibration as set by the manufacturer. This may enable the recipient 306 to establish a physical connection between the verification equipment 310 and the deliverable, as described above, and obtain verification information without the need to calibrate the verification equipment 310 prior to obtaining the verification information. The verification information may include a signature, a score, or other indication of whether the deliverable have been tampered with, as described above. For example, the verification equipment 310 may display a number to the recipient 306 which the recipient may compare with information provided by the manufacturer 302 in order to determine if the deliverable has been tampered with. Furthermore, the verification equipment 310 a signature or other information the is verifiable by recipient 306. The verifiable information may indicate that the verification equipment 310 was provided by the manufacturer 302 and has not been tampered with. For example, the verification equipment 310 may include barcode or other information that may be used to generate a digital signature that can then be verified. In another example, the verification equipment 310 may include software that may be digitally signed by the manufacturer 302.

Figure 4:
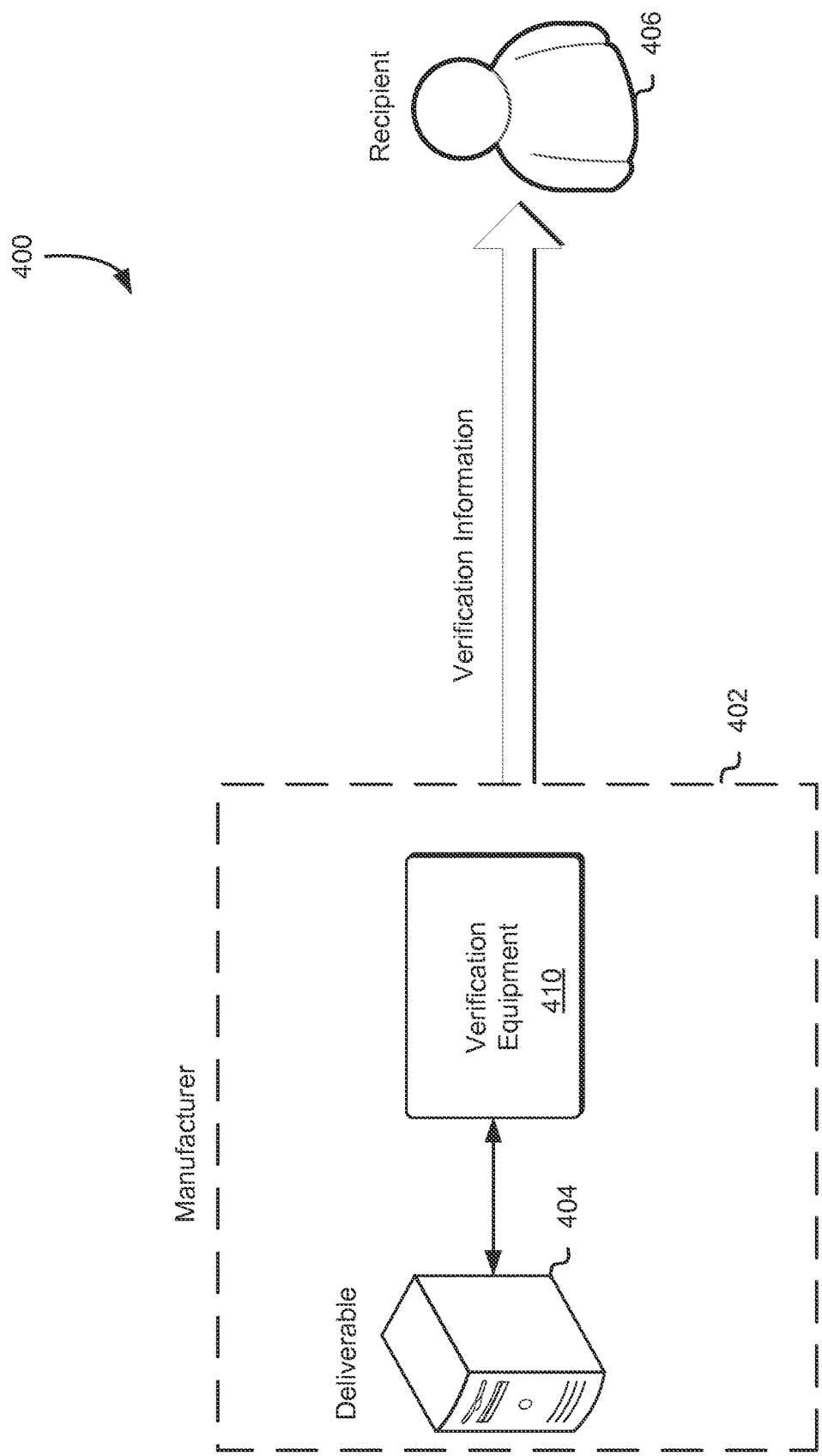
FIG. 4 illustrates an environment in which a manufacturer may provide verification information to a recipient in accordance with an embodiment.

FIG. 4 illustrates an environment 400 in which a manufacturer 402 may determine verification information for a deliverable 404 in accordance with the present disclosure. The verification information may be used by a recipient 406 to determine if the deliverable 404 has been tampered with in transit to the recipient 406. For example, as described above, the verification information may include a signature that the recipient may compare to a second signature determined by the recipient's 406 verification equipment. The manufacturer 402 may as part of the manufacturing and/or shipping process generate a signature for the deliverable 404 prior to providing the deliverable 404 to the recipient 406.

The signature may be included in the verification information provided to the recipient 406. For example, the signature may be included along with a serial number or other identification information for the deliverable 404 and a tolerance level for any signatures generated by the verification equipment provided to the recipient 406. In various embodiments, the verification information only include the signature to be used by the recipient 406 to determine if the deliverable 404 has been tampered with.

In order to generate at least a portion of the verification information, the manufacturer 402 may establish a physical connection between the deliverable 404 and the verification equipment 410. The verification equipment 410 may then execute a plurality of the tests configured to obtain information from the deliverable 404, the results of the plurality of tests may be used by the manufacturer 402 to generate a signature for the deliverable 404. The plurality of test may include any of the test described herein in connection with verifying that the deliverable 404 has not been tampered with. For example, the manufacturer 402 may utilize the verification equipment 410 to determine an impedance measurement at various ports of the deliverable 404. The various ports may enable connections to one or more circuits of the deliverable. The manufacturer 402 may then use the determined impedance measurements to generate a signature to include in the verification information.

Similarly, the verification equipment 410 may also be configured load executable instructions into memory of the deliverable 404 and cause execution of the instructions loaded into memory by one or more processors of the deliverable 404. The executable instructions loaded into memory, when executed by the one or more processors, may cause the deliverable 404 to perform various calculations and the verification equipment 410 may determine an amount of time required by the deliverable 404 to complete the calculations. As described above, multiple measurements and results obtained by the verification equipment 410 may be used in generating a single signature and/or included in the verification information provided to the recipient 406.

The verification equipment 410 may be configured to perform a set of operations such as impedance testing, acceptance testing, or other operation suitable for generating the signature of the deliverable 404. For example, the verification equipment 410 may determine a waveform corresponding to various signals which may be obtained from the deliverable 404, such as various types of radiation that may be obtained from the deliverable 404. In various embodiments, the verification equipment 410 generates the signature based at least in part on information obtained by performing the set of operations. In yet other embodiments, the verification equipment 410 is configured to provide the information obtained by performing the set of operations to another computer system of the manufacturer 402 responsible for generating the signature. For example, manufacturer may operate a webserver including an interface for communicating information to the recipient. The verification equipment 410 may provide the webserver with information corresponding to the set of operations performed on the deliverable 404, such as impedance measurements, hashes of software or firmware loaded into memory of the deliverable 404, and latency of various calculation performed by the deliverable 404. The webserver may then determine the signature for the deliverable based at least in part on the provided information and may transmit the determined signature to the recipient 406.

The verification equipment 410 or other computing device of the manufacturer 402 may determine a tolerance level within which the signature for the deliverable 404 may be considered as matching the signature generated by the recipient. The verification equipment 410 may, for example, determine the tolerance level by at least taking a plurality of measurements and calculating a variance between at least a portion of the plurality of measurements. The tolerance level may be based at least in part on the calculated variance such that a measurement or obtained information within the variance may be considered within the tolerance level.

Figure 5:
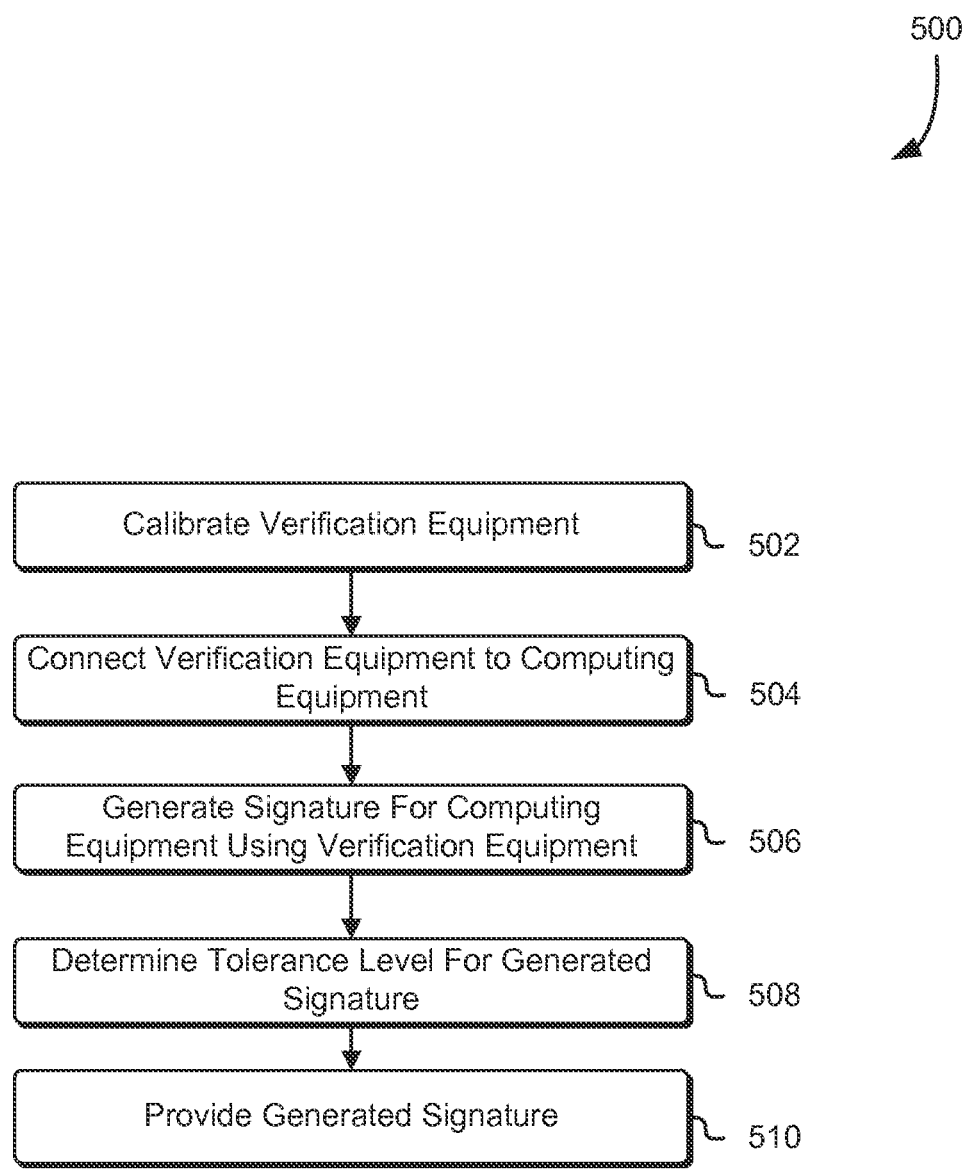
FIG. 5 illustrates an example process for determining verification information for computing equipment to be delivered to a recipient in accordance with an embodiment.

FIG. 5 shows an illustrative example of a process 500 which may be used to generate a signature for computing equipment using verification equipment of a manufacturer in accordance with an embodiment. The process 500 may be performed by any suitable system or combination of systems such as the verification equipment described above in connection with FIG. 4. Returning to FIG. 5, in an embodiment, the process 500 includes calibrating the verification equipment 502. As described above in FIG. 3, the manufacturer may calibrate the verification equipment in order to ensure that measurement and other operations performed by the verification equipment are suitable to generating a signature for the computing equipment to be provided to the recipient. In numerous variations to the process 500, the manufacturer may calibrate the verification equipment and provide the verification equipment to the recipient prior to delivery of the computing equipment requested by the recipient.

Returning to FIG. 5, in an embodiment, the process 500 further includes connecting the verification equipment to the computing equipment 504. For example, the verification equipment may be connected over a physical link to a port of the computing equipment, such as a USB port or Ethernet port. The physical connection may enable communication between the verification equipment and the computing equipment as well as enable the verification equipment to measure impedance and electrical current at various points on the computing equipment. For example, the verification equipment may pass a waveform or signal, such as an electrical current, over the physical connection to a circuit of the computing equipment in order to measure an electrical property of the circuit. The computing equipment may include specific ports and/or inspections pins configured to enable the physical connection between the verification equipment and the computing equipment. The manufacturer may then generate a signature for the computing equipment using the verification equipment 506. The verification equipment may, as described above, perform a set of operations and obtain information corresponding to the computing equipment suitable for generating the signature for the computing equipment. For example, the verification equipment may perform acceptance testing on the computing equipment and obtain latency and impedance information corresponding to the performance of the computing equipment. The obtained information may then be included in a signature generated by the verification equipment.

Once the verification equipment have generated the signature, a tolerance level may be determined for the generated signature 508. As described above, the tolerance level may indicate an amount by which a signature generated by the recipient may vary from the signature generated by the manufacturer and still indicate that the computing equipment has not been tampered with. The tolerance level may indicate a different amount for each component of the signature or a total amount of components of the signature that may vary from the manufacturer provided signature. The tolerance level may be determined based at least in part on a fidelity of the measurements and other information obtained by the verification equipment and/or the accuracy of the verification equipment. The manufacturer may then provide the generated signature to the recipient 510. The manufacturer may utilize a notification service or similar mechanism for providing the generated signature. The notification service may comprise a collection of computing resources collectively configured to provide a web service or other interface and browser-based management console. The management console can be used to configure topics for which the recipient seeks to receive notifications, signatures, tolerance levels, verification information, identification information for the computing equipment, or configure delivery of the messages over the recipients' protocol of choice (i.e., hypertext transfer protocol (HTTP), e-mail and short message service (SMS), among others). The notification service may provide notifications to the recipient using a "push" mechanism without the need to periodically check or "poll" for new information and updates. In numerous variations to the process 500, the verification equipment and the generated signature may be provided to the recipient prior to the manufacturer sending the computing equipment to the recipient.

Figure 6:
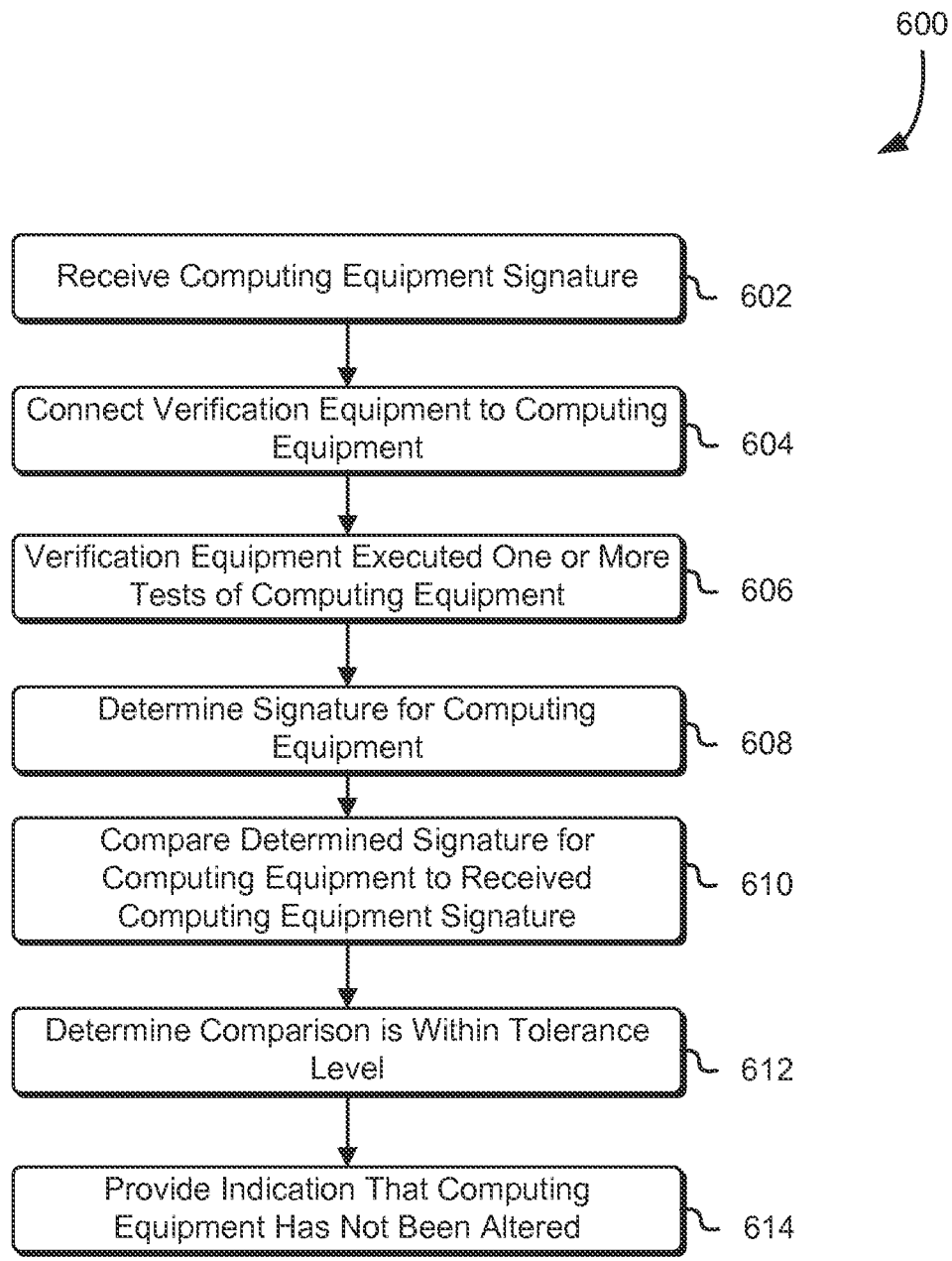
FIG. 6 illustrates an example process for determining whether computing equipment has been altered during delivery in accordance with an embodiment.

FIG. 6 shows an illustrative example of a process 600 which may be used to determine if computing equipment has been tampered with based at least in part on a signature determined by verification equipment of a recipient. The process 600 may be performed by any suitable system or combination of systems such as the verification equipment described above in connection with FIG. 2. Returning to FIG. 6, in an embodiment, the process 600 includes receiving a computing equipment signature 602. As described above, the manufacturer may determine the signature for the computing equipment and provide the signature to the recipient. The recipient may then connect the verification equipment to the computing equipment 604. The recipient may connect to verification equipment to a port or interface of the computing equipment. For example, the computing equipment may contain a set of exposed pins which may be used in connection with the verification equipment to the computing equipment. Furthermore, the set of exposed pins may be tamper resistant.

Once the verification equipment is connected, the verification equipment may execute one or more tests of the computing equipment 606. The one or more tests may be configured to measure and/or determine various attributes of the computing equipment as described above. For example, the verification equipment may measure the impedance across various point on the computing device. The verification equipment may then determine a signature for the computing equipment 608. The determine signature may be based at least in part on result obtained by the verification equipment from executing the one or more tests. The determined signature for the computing equipment may then be compared to the received signature for the computing equipment 610. The recipient may provide the received signature to the verification equipment, for example, by inputting the signature into an input device of the verification equipment. In numerous variations to the process 600, the verification equipment may provide the recipient or another computing device with the determined signature through an output device of the verification equipment.

Returning to FIG. 6, the verification equipment may determine if the determined signature for the computing equipment and the received signature for the computing equipment are within a tolerance level. For example, the verification equipment may determine that the value of the determined signature for the computing equipment is a tolerance value of the value of the received signature of the computing equipment. As a result, the verification equipment may provide the recipient with an indication that the computing equipment has not been altered or otherwise tampered 614. The indication may be provided by an output device of the verification equipment. Additionally, if the verification equipment determines that the received signature and the determined signature are not within the tolerance level or otherwise do not match, the verification equipment may provide the recipient with an indication that the computing device has been altered or tampered.

Figure 7:
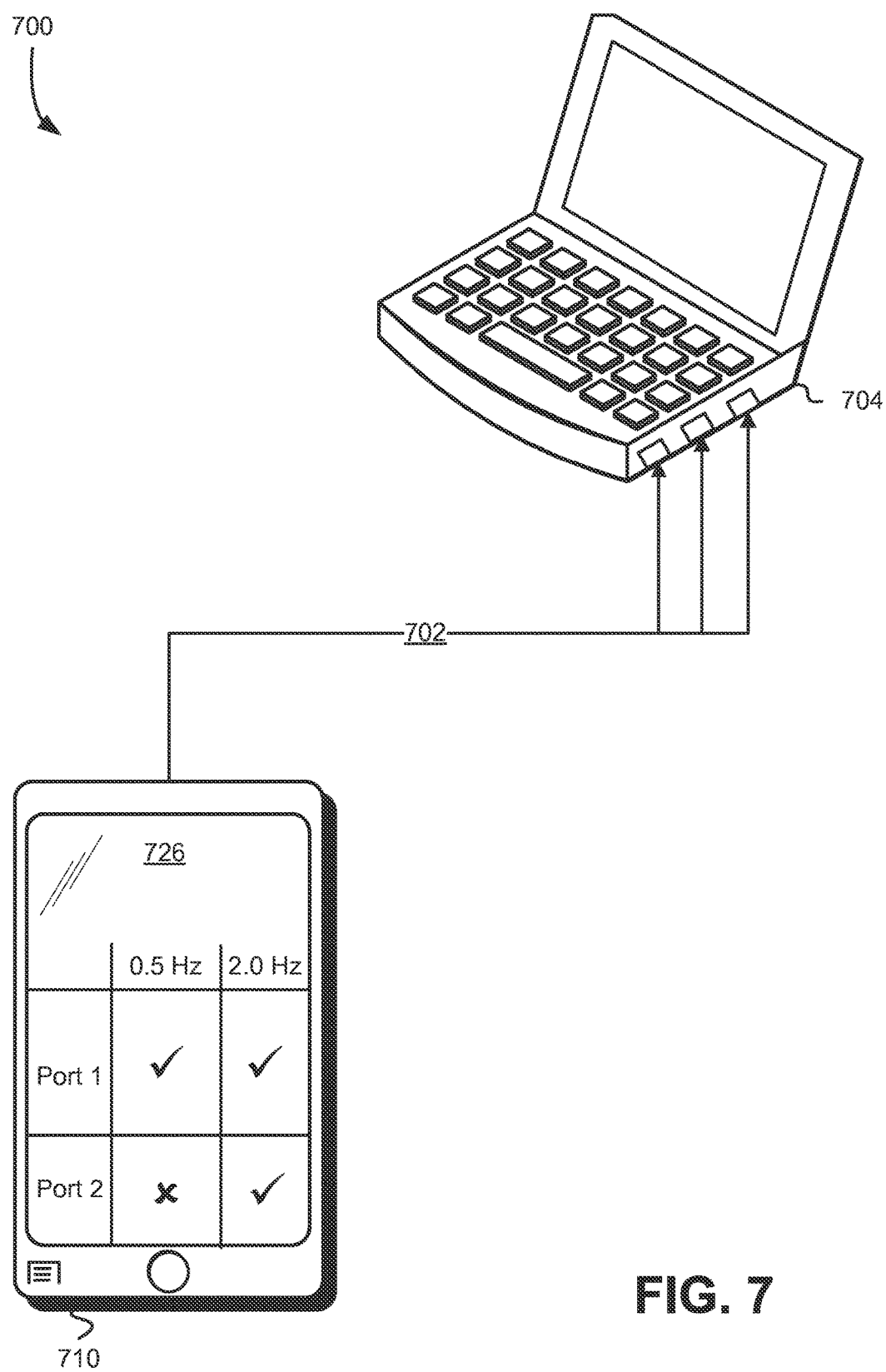
FIG. 7 illustrates an environment in which verification equipment may be used to determine whether a computing devices has be tampers with in accordance with an embodiment.

FIG. 7 illustrates an environment 700 in which a recipient may determine verification information for a deliverable 704 in accordance with the present disclosure. The verification information may be used by to determine if the deliverable 404 has been tampered with in transit to the recipient. For example, as described above, the verification information may include a signature that the recipient may compare to a manufacturer signature as described above. The verification information may be displayed on an interface 726 of the verification equipment 710. The recipient may establish various physical connections 702 between the verification equipment 710 and the deliverable 704. The verification equipment 710 may include a set of cables which may be connected to various ports of the deliverable 704. Furthermore, the cables may be color coordinated to match connection ports of the deliverable 704 or otherwise indicate which ports to connect to the verification equipment 710.

The deliverable 704 may include variety of ports and/or interfaces suitable for connecting the verification equipment 710. For example, the deliverable may include a USB, a Video Graphics Array (VGA) port, a display port, a High-Definition Multimedia Interface (HDMI) port, a Digital Visual Interface (DVI) port, a IEEE 1394 (e.g., FireWire) port, an audio port, a PS/2 port, a serial port, an external serial ATA port, or other port suitable for connecting the verification equipment 710. Furthermore, the verification equipment 710 may perform multiple tests on a single port. For example, an HDMI or a USB port may comprises multiple conductors (e.g., pins), the verification equipment 710 may perform various test using different sets of conductors of the port. The test may, for example, measure the impedance or other properties (e.g. voltage sources, current sources, resistances, inductances, capacitances) of a circuit connected to the port. The circuit may include an electrical circuit comprising of a closed loop, giving a return path for the current, and an interconnection of electrical components (e.g. batteries, resistors, inductors, capacitors, switches). Generally, the techniques described herein may be used to measure properties of circuits and sub-circuits, accessible via the ports, include conventional ports include in the deliverable 704 such as a USB port or a special purpose port included by the manufacturer for the purpose of verification.

The verification equipment 710 may generate a signature by at least executing a variety of different test using the physical connection 702. In various embodiments, the verification equipment 710 is configured to automatically generate the signature and determine if the deliverable 704 has been tampered with once the physical connection 702 to the deliverable 704 has been detected. Additionally, the verification equipment 710 may be configured with a tolerance level. For example, the measured impedance for various circuits of the deliverable included in the signature generated by the verification equipment needs to be within a predefined range in order for the verification equipment 710 to determine that the measured impedance matches the signature provided by the manufacturer. The tolerance level (e.g., predefined range) may differ between components of the signature of the deliverable 704. For example, the tolerance level for the measured impedance may be greater than the tolerance level for the weight of the deliverable 704. In yet other embodiments, the tolerance level for a component of the signature may be zero or otherwise indicate that the measured value and the value provided by the manufacturer must match. For example, if the signature includes a hash of the software loaded into memory of the deliverable 704, the manufacturer may indicate that the hash values must match in order for the verification equipment 710 to determine that the deliverable 704 has not been tampered with. As illustrated in FIG. 7, the interface 726 may indicate if the signature determined by the verification equipment 710 matches the signature provided by the manufacturer. As described above, only a portion of the signature may match and the verification equipment 710 and/or recipient may determine the deliverable 704 has not been tampered with. For example, as illustrated in FIG. 7, the measure impedance for port 2 may not match the value provided in the manufacturer's signature but the recipient may determine that the deliverable 704 has not been tampered with.

Figure 8:
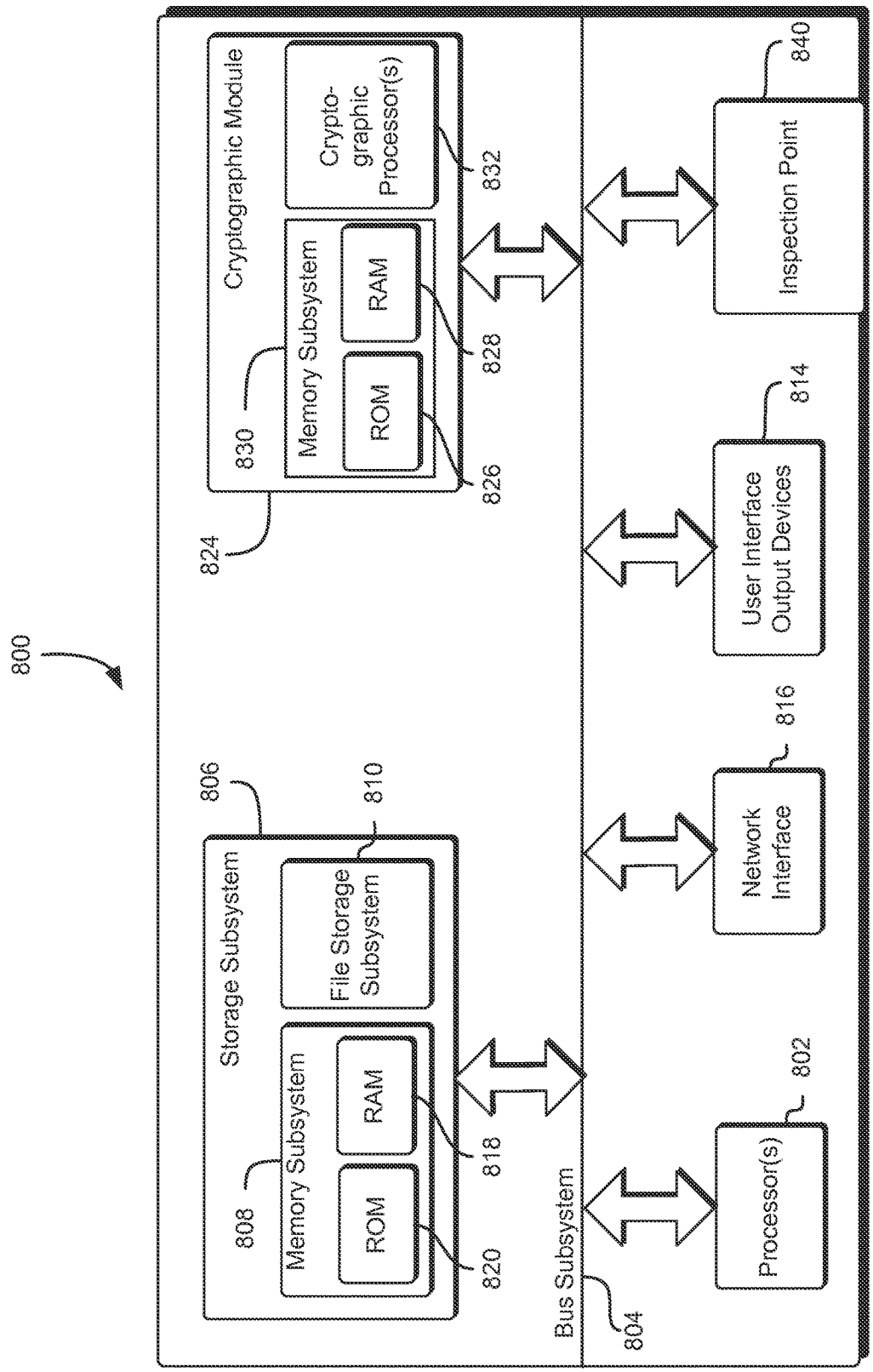
FIG. 8 is an illustrative example of components of computing equipment for which a signature may be determined in accordance with one embodiment.

FIG. 8 is an illustrative, simplified block diagram of an example device 800 that may be used to practice at least one embodiment of the present disclosure. In various embodiments, the device 800 may be used to implement any of the systems illustrated herein and described above. For example, the device 800 may be used to implement a verification equipment, in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface output devices 814, a network interface subsystem 816, a cryptographic module 824, comprising a memory subsystem 830 and one or more cryptographic processors 832.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses. An inspection point 840 may be connected to the bus system 804. The inspection point 840 may include a set of inspection pins, as described above, which may be used to establish a physical connection with the verification equipment. For example, the inspection point 840 may be a Joint Test Action Group (JTAG) port or interface configured to enable various tests of the device system 800. In another example, the inspection point 840 may include a fuse configured to indicate the first time the device system 800 is turned on. The fuse may be configured such that the first time the device system 800 is turned on the fuse is blown and an indication is provided, such as an indicating pin, striker pin, indicating disc, or element window. The fuse may be installed at a time enabling a customer receiving the device to inspect the fuse, thereby determining if the device has been powered on while in transit (a sign of unauthorized access to the device).

The network interface subsystem 816 may provide an interface to other device systems and networks. The network interface subsystem 816 may serve as an interface for receiving data from and transmitting data to other systems from the device system 800. For example, the network interface subsystem 816 may enable transmission of computing device signatures and other information, such as electronic requests to access a system (e.g., receive a webpage) and may enable receipt of responses to the requests, such as webpages or other information. The network interface subsystem 816 may also facilitate the receipt and/or transmission of data on other networks, such as an organizations intranet and/or other networks described below.

User interface output devices 814, if any, may include a display subsystem or non-visual displays, such as audio and/or tactile output devices, etc. Generally, the output devices 814 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate, such as presenting the user with information corresponding to a signature determined for a connected computing device. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the DiffieHellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 9:
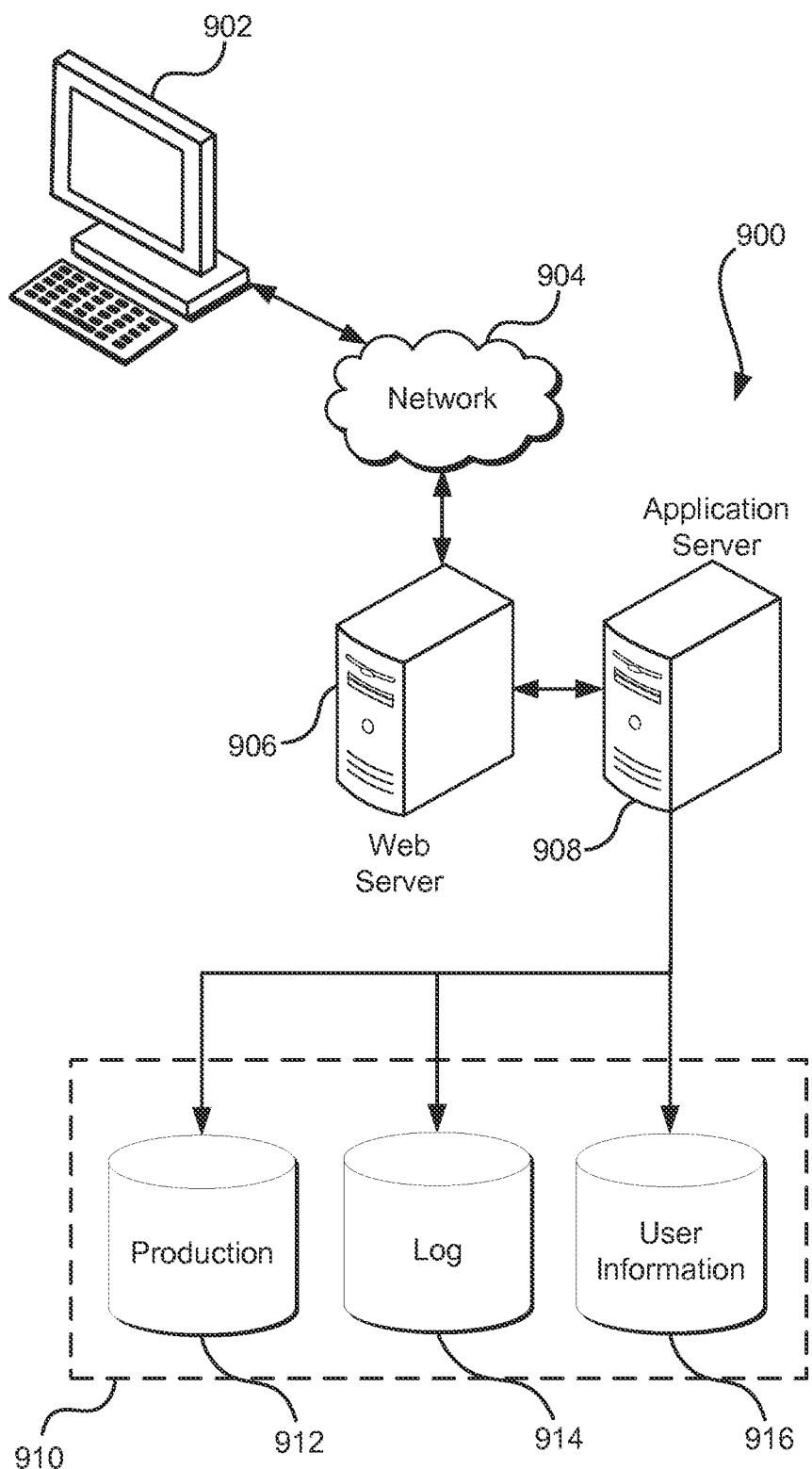
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein, including IEEE 1149.1 Standard Test Access Port and Boundary-Scan Architecture or JTAG, are hereby incorporated by reference to the same extent as if each reference were individually and specifically indicated to be incorporated by reference and were set forth in its entirety herein.

What is claimed is:

1. A computer-implemented method, comprising:
    establishing a physical connection between a computing device and a verification device;
    executing, by the verification device, a set of tests of the computing device, the set of tests configured to collect a set of measurements of properties of the computing device suitable for generating a signature of the computing device, the signature of the computing device based at least in part on a set of properties unique to the computing device that, when changed, indicates modification to the computing device, where at least one test of the set of tests comprising passing a waveform over the physical connection through a circuit of the computing device to measure an electrical property of the circuit;
    obtaining a set of results corresponding to the set of tests;
    determining the signature for the computing device based at least in part on the set of results; and
    providing the signature to a recipient of the computing device to enable the recipient to verify the computing device.

2. The computer-implemented method of claim 1, wherein the computer-implemented method further includes calibrating the verification device based at least in part on a standard determined by a manufacturer of the computing device.

3. The computer-implemented method of claim 1, wherein the set of tests of the computing device further comprise a plurality of tests that, if executed by the verification device, each test passes waveform over the physical connection through a plurality of different circuits of the computing device to measure electrical properties of the computing device.

4. The computer-implemented method of claim 1, wherein the computer-implemented method further includes determining a tolerance level for the signature, where the tolerance level indicates a range of values for the electrical property of the circuit associated with the signature.

5. A system, comprising:
    at least one computer system configured to implement one or more services, wherein the one or more services are configured to:
    perform a plurality of tests of a computing device to measure a plurality of attributes of the computing device, the plurality of tests measuring, over a physical connection between the system and the computing device, a plurality of attributes of the computing device that are unique to the computing device;

generate a signature based at least in part on a plurality of results, the signature being usable to detect unauthorized modifications to the computing device by determining whether the signature matches a signature of the computing device computed at a different time; and provide the signature to a recipient of the computing device to enable the recipient to verify the computing device.

6. The system of claim 5, wherein performing the plurality of tests of the computing device further comprises performing at least one memory test of the computing device in order to obtain information corresponding to a memory of the computing device.

7. The system of claim 5, wherein the plurality of tests further comprises at least one configured to measure a frequency response to an applied signal.

8. The system of claim 5, wherein the one or more services are further configured to generate the signature by at least combining the plurality of results.

9. The system of claim 5, wherein the plurality of tests further comprises at least one configured to determine a weight of the computing device.

10. The system of claim 5, wherein the one or more services are further configured to provide the signature to a recipient of the computing device in an electronic message.

11. The system of claim 5, wherein the plurality of tests further comprises at least one configured to cause a processing unit of the computing device to perform a calculation and measure a latency in obtaining a result of the calculation.

12. The system of claim 5, wherein the plurality of tests further comprises at least one configured to test executable code loaded into memory of the computing device.

13. A non-transitory computer-readable storage medium having stored thereon executable instructions that, if executed by one or more processors of a computer system, cause the computer system to at least:

execute, by a verification device physically connected to a computing device, a plurality of tests of the computing device configured to determine a plurality of values corresponding to the computing device, where at least one value of the plurality of values is variable based at least in part on one or more attributes of the computing device;

generate a signature for the computing device based at least in part on the plurality of values; and provide the signature to a recipient of the computing device to enable the recipient to verify the computing device.

14. The non-transitory computer-readable storage medium of claim 13, wherein the instructions that cause the computer system to:

provide the signature to at least one other computer system, where the at least one other computer system includes a reference signature generated based at least in part on the computing device; and receive from the at least one other computer system, an indication that the reference signature and the signature match.

15. The non-transitory computer-readable storage medium of claim 13, wherein the instructions further comprise instructions that, if executed by the one or more processors, cause the computer system to:

calculate a level of power consumption of the computing device; and wherein generating the signature for the computing device is further based at least in the level of power consumption of the computing device.

16. The non-transitory computer-readable storage medium of claim 13, wherein the instructions further comprise instructions that, if executed by the one or more processors, cause the computer system to:

receive a reference signature generated based at least in part on the computing device;

verify the reference signature matches the signature; and indicate whether the reference signature and the signature match.

17. The non-transitory computer-readable storage medium of claim 13, wherein the instructions further comprise instructions that, if executed by the one or more processors, cause the computer system to:

execute, by a verification device, a plurality of tests of the computing device; and wherein generating the signature for the computing device further includes generating the signature based at least in part on a set of results obtained from the plurality of tests.

18. The non-transitory computer-readable storage medium of claim 13, wherein:

the instructions further comprise instructions that, if executed by the one or more processors, cause the computer system to execute the test of the computing device over a plurality of executions; and wherein generating the signature for the computing device further includes generating the signature based at least in part on a set of determined values corresponding to the plurality of executions of the test of the computing device.

19. The non-transitory computer-readable storage medium of claim 18, wherein the instructions that cause the computer system to execute the test of the computing device further include instructions that cause the computer system to execute the test of the computing device a plurality of times, where at least a portion of the plurality of executions of the test pass a current over a different set of pins of the port then at least one other execution of the test.

20. The non-transitory computer-readable storage medium of claim 19, wherein the instructions further comprise instructions that, if executed by the one or more processors, cause the computer system to:

execute a second test of the computing device, where the second test is configured to determine a second value corresponding to an application loaded into memory of the computing device; and wherein generating the signature for the computing device further includes generating the signature based at least in part on the plurality of values and the second value.

* * * * *

UNITED STATES PATENT AND TRADEMARK OFFICE
CERTIFICATE OF CORRECTION

| | | |
|---|---|---|
| PATENT NO. | : 9,876,645 B1 | Page 1 of 1 |
| APPLICATION NO. | : 14/624480 | |
| DATED | : January 23, 2018 | |
| INVENTOR(S) | : Harsha Ramalingam et al. | |

It is certified that error appears in the above-identified patent and that said Letters Patent is hereby corrected as shown below:

In the Specification

Column 10, Line 64:
tolerance level.

Should read as:
tolerance level 612.

Column 11, Line 15:
404

Should read as:
704

Signed and Sealed this
Twenty-sixth Day of June, 2018

Andrei Iancu
*Director of the United States Patent and Trademark Office*